April 13, 1937.  P. DRINKER ET AL  2,076,554
APPARATUS FOR MEASURING, RECORDING, AND
CONTROLLING DILUTE DUST CONCENTRATIONS
Filed Jan. 21, 1932  2 Sheets-Sheet 1
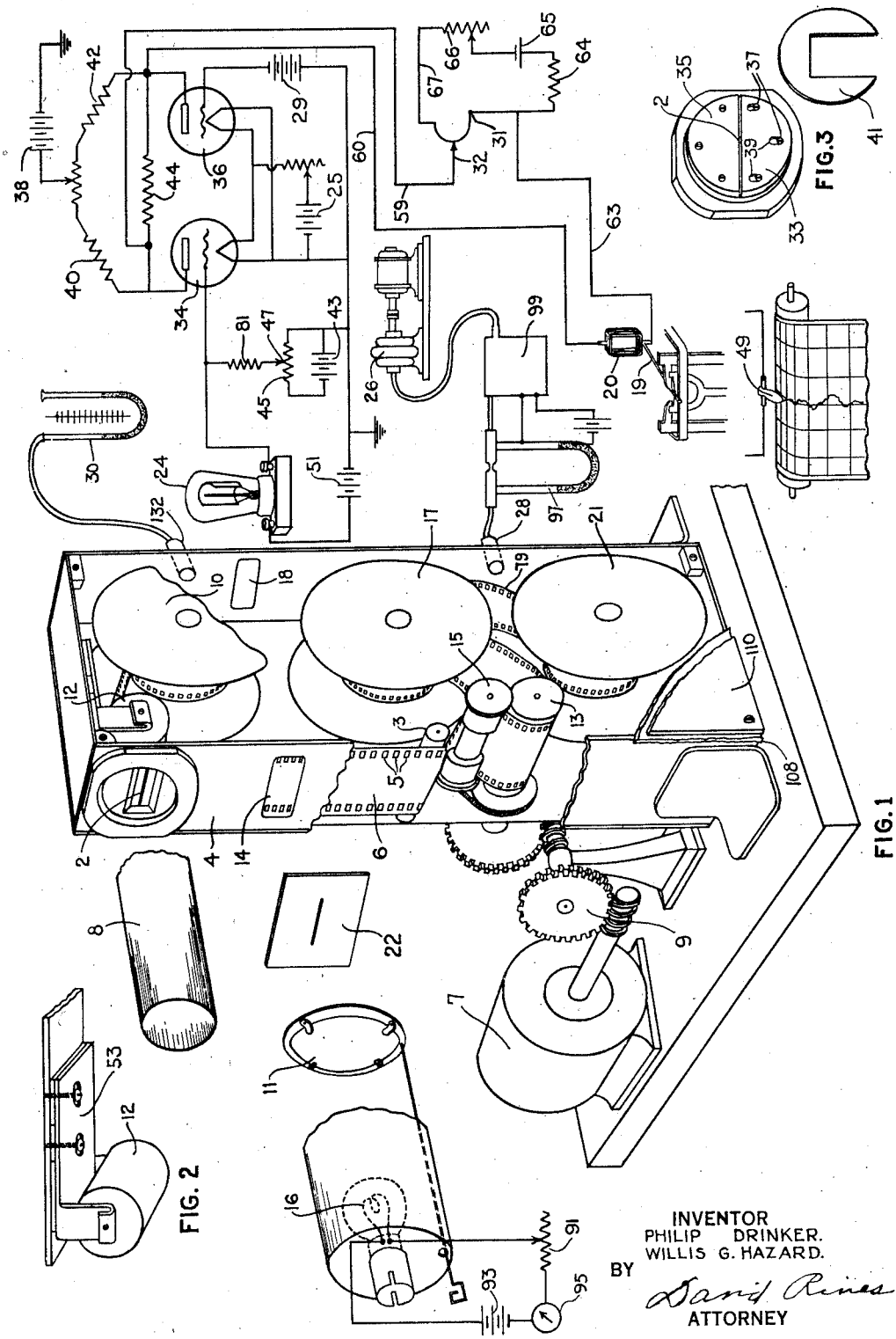
INVENTOR
PHILIP DRINKER.
WILLIS G. HAZARD.
BY
David Rines
ATTORNEY April 13, 1937.   P. DRINKER ET AL   2,076,554
APPARATUS FOR MEASURING, RECORDING, AND
CONTROLLING DILUTE DUST CONCENTRATIONS
Filed Jan. 21, 1932   2 Sheets-Sheet 2

INVENTOR
PHILIP DRINKER.
WILLIS G. HAZARD.
BY David Rines
ATTORNEY

Patented Apr. 13, 1937

2,076,554

UNITED STATES PATENT OFFICE 2,076,554

APPARATUS FOR MEASURING, RECORDING, AND CONTROLLING DILUTE DUST CONCENTRATIONS

Philip Drinker, Brookline, and Willis Gilpin Hazard, Jamaica Plain, Mass.

Application January 21, 1932, Serial No. 587,854

1 Claim. (Cl. 88—14)

The present invention relates to apparatus for determining, measuring, recording, controlling and the like, the concentration of dilute dust suspended in air and other gases.

It is desirable in many cases to determine the dust content of the air of a room, particularly where the dust concentration may furnish a recognized or suspected dust hazard. If the atmosphere of a factory or other industrial establishment, such as a mine, carries more than a certain, safe proportion of silica dust, for example, the workmen exposed to and breathing the air therein may contract silicosis. Such silica dust particles, which may be no more than one twenty-five-thousandth of an inch in diameter, are very widely distributed in quarries, subways, foundries, and cutlery establishments, and wherever else pulverized quartz or sand is abundant. It is important for the hygienist investigating dust and dust-like impurities as a menace to health, in controlling industrial diseases, to be able to determine and record the dust concentration of the atmosphere.

It is further desirable, in other cases, to control industrial processes where mixtures of dust and gases are fundamental to the carrying out of the process; as, for example, in the manufacture of zinc oxide and other pigments.

An object of the invention is to provide novel apparatus for continuously measuring, recording or controlling dilute dust concentrations suspended in air or other gases.

Other and further objects will be explained hereinafter and will be particularly pointed out in the appended claim.

Figure 4:
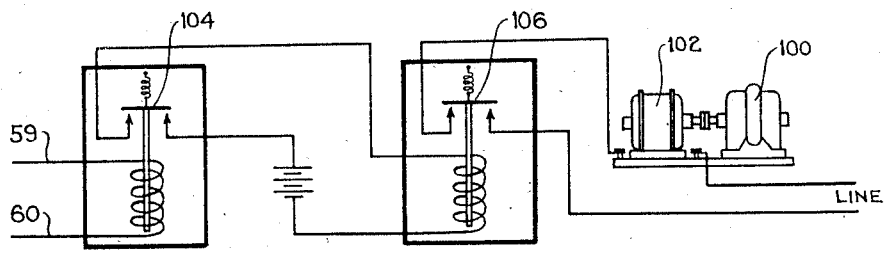
Figure 5:
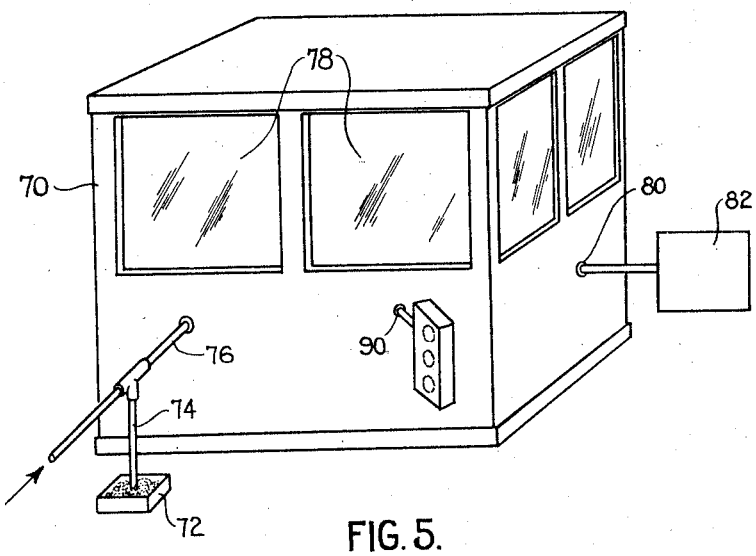

The invention will now be explained in connection with the accompanying drawings, in which Fig. 1 is a diagrammatic, perspective view of apparatus and circuits constructed and arranged according to a preferred embodiment of the present invention; Figs. 2 and 3 are perspectives of portions of the apparatus shown in Fig. 1, parts of the apparatus illustrated in Fig. 3 being shown detached; Fig. 4 is a diagrammatic view of a modification; and Fig. 5 is a diagrammatic view of calibrating apparatus.

Referring, first, to Fig. 1, the gas to be tested, containing the dilute dust concentration, such as dusty air, is assumed to be contained in a room or other space (not shown). A stream of the dust-laden air or other gas is drawn by a suction pump 26 at a predetermined station, through a predetermined region or area, shown as a slit-shaped orifice or jet 2, into an air-tight, preferably metal, casing 4, towards a slowly moving strip of transparent, scratch-free, substance, such as a moving-picture-film base 6. The suction pump 26 may be driven in any desired manner, as by means of a motor, as shown. The path of the dust-laden air is continuously directed toward that portion of the film 6 that is disposed over an idler roll 12, which is disposed at a fixed distance from, and opposite to, the jet 2; and because the casing 4 is air-tight, dust is prevented from becoming deposited on the film except at the predetermined station. The slit or jet 2 is very narrow and its area is quite restricted. Its width may, for example, be of the order of one-tenth of a millimeter. The dust-laden air enters the casing, therefore, at high velocity.

The chamber may be a humidifying chamber, shown as a tube the walls of which are lined with wet blotting paper to moisten the gas.

The suction pump 26 is connected by a pipe 28 with an opening of the casing 4 through an automatic flow-regulator. The automatic flow-regulator is designed to maintain a preferably constant air flow through the jet 2 and may assume many forms. As illustrated in Fig. 1, it comprises a flow meter or mercury manometer 97 and an automatic, constant-flow regulator 99. The manometer 97 measures the negative pressure in the casing 4, and will indicate whether the jet 2 becomes plugged. A mercury manometer 30 may be connected with the casing at 132 to aid in controlling the velocity through the jet. A rubber or other gasket 108 between the body of the casing 4 and its cover 110 maintains the casing air tight. Because of the high velocity at which the gas enters the casing 4, the pressure of the gas traveling through the jet 2 as the theory is understood, becomes greatly reduced, with a resulting fall in temperature and a consequent condensation of the moisture of the gas upon the dust particles. The thus-wet dust particles impinge upon the film 6 and, if small enough, become deposited thereon. The moisture evaporates, leaving the now-dried dust particles adhering to the film. This theory may not, however, be correct.

Further to theorize, if the particular dust at hand is soluble in water, passage through the humidifying chamber 8 causes saturation of the air, and the dust deposited on the film 6, further wet by condensation on passing through the jet in the manner just described, takes the form of crystals rather than of the original unchanged particles. To reduce the likelihood of such a saturated solution, when dealing with a dust soluble in water, the humidifying chamber is removed.

The film 6 may be continuously unwound from a reverse spool 10, and over the roll 12 and guide rolls 3 and 15, by a motor 7, acting upon a driving sprocket 13 through suitable reduction gearing 9. It is thus caused to travel continuously past the said station over its supporting rolls. The film 6 may be provided with the usual perforations 5 fitting over the teeth of the sprocket wheel 13. The speed of travel of the film may be, say, twenty centimeters per hour. After passing over the sprocket wheel, the film is wound on a spool 17. A spacer film 79 may be unwound from a spool 21, and wound on the spool 17 along with the film 6, to space the successive coils of the film 6 and prevent scratching off or dislodging the dust therefrom. If it is desired to record dustiness, or run alarm systems, special lights, motors or the like, without preserving the record, the spacer film 79 may be omitted.

The time corresponding to the record may be indicated on the film in any desired manner. It is preferred to employ the following expedient. Periodically the electric suction pump 26 is stopped for a brief interval, thus permitting a strip of "dustless" film to pass before a window 14. The light 16 then shines with its initial undiminished intensity on the light-sensitive device and the recorder returns to "zero". One advantage of this procedure is to check frequently the amplifier and light source for a shift of zero, which may easily occur during a day's run. The pump may be stopped and started in any desired manner, as by a commutator (not shown) mounted on the outside end of the shaft carrying the sprocket 13. As this is driven by the constant speed motor 7, the blank dustless strips on the film consequently act as a time record.

After traveling past the jet 2, the dust-carrying film 6 travels in the casing 4 to the window 14. A beam of light from a lamp 16, the intensity of which is maintained constant by adjustment of a rheostat 91, in series with a battery 93 and an ammeter 95, and the rays of which are rendered parallel-rayed by a lens 11, travels through the window 14 and through a second window 18 to a light-sensitive means, such as a photo-electric cell 24. The beam of light rays may be made rectangular by a diaphragm 22, the width of the rectangular beam being the same as that of the dust deposited on the film 6. Variations of the dust concentration deposited on the film 6 are measured by the fluctuations in the intensity of the beam of light thus transmitted to the cell 24 from the lamp 16 and through the windows 14 and 18.

It is not essential, of course, that all the dust be deposited on the film, but merely that the proportion of the dust so deposited be constant and known.

The output from the light-sensitive cell may be amplified in any desired manner. If the beam is uninterrupted, a direct-current amplifier is appropriate. Such a circuit, designed to compensate for changes of the plate battery voltage will now be described.

The light-sensitive cell 24 is connected in the input circuit of a suitable amplifier, which may preferably be constituted of two vacuum tubes 34, 36 connected in two adjacent arms of a Wheatstone bridge, for reasons hereinafter explained. The other two arms of the bridge are provided with impedances 40 and 42. Across the output circuits of the amplifier tubes 34, 36, which are energized by a common B battery 38, there may be connected a suitable recorder or recording meter, such, for example, as the recording potentiometer disclosed in Letters Patent of the United States No. 1,356,804, granted October 26, 1930. The recorder may comprise a chart on which a written record is continuously made by a marker or stylus 49 simultaneously with the deposit of dust upon the film. In order to simplify the description, the reference numerals 19, 20, 31, 32, 49, 59, 60, 63, 64, 65, 66 and 67 are used herein to designate the same or similar parts as are indicated by the said reference numerals in the said Letters Patent. The tubes 34 and 36 have a common filament battery, shown at 25. Grid bias potentials for the two tubes are derived from separate grid batteries, 43 and 29, respectively. A high grid resistor 81, and the grid battery 43, whose potential may be adjusted by the potentiometer 45, are placed in series between the grid and filament of tube 34. Current from the light-sensitive cell 24 applied across the resistor 81 produces a voltage drop and a change of bias on the grid which, in turn, result in a modification of the plate current of the tube 34. Shunted across the plates of the two vacuum tubes is a resistor 44 of a few hundred ohms.

The adjustment and operation of the amplifier is as follows. Initially, when the film 6 interposed between the light source 16 and the light-sensitive device 24 in the manner already described, is uncoated with deposited dust, the movable element 47 of the potentiometer 45 is adjusted until no current flows through the resistor 44, as registered on the recording meter by the marker or stylus 49. When a dust deposit on the film 6 decreases the intensity of light transmitted from the lamp 16, a change in plate current of the tube 34 is effected. Consequently, a current now flows through the resistor 44, causing a voltage drop in it, which actuates the marker or stylus 49. The magnitude of the voltage drop in the resistor 44 is thus dependent on the quantity of dust deposited on the film 6 by the jet 2.

The zero point,—or, the point to which the recorder stylus 49 returns when dust-free film passes through the beam of light rays,—must remain constant for several hours, during which measurements are made or control is effected. To bring this about, the slow running down of the A, B and C batteries 25, 38, 29 and 43, and the effects produced by unsteadiness of the amplifier 34, 36 from other sources, must be minimized or compensated for. A chief purpose of the Wheatstone-bridge arrangement is to compensate for the changes in the B battery 38. The drain on the C batteries 29 and 43 is so slight that the effect produced by their deterioration is negligible. The decline of the A battery 25 and the light-source battery 93 may be minimized by using low-filament-current vacuum tubes 34, 36, a low-current lamp 16, say 3 cp., and an over-size battery.

Certain other circuit values, such as the high-grid resistor of several megohms, are also required to be maintained constant. Difficulties arising from leakage and extraneous electric fields are met by shielding and insulating both the light-sensitive cell 24 and the amplifier tubes 34, 36, and avoiding the use of long lead wires. With proper precautions, random fluctuations will be minimized from the output, and the circuits will be sufficiently stable and sensitive.

The apparatus can be so designed that the light-sensitive cell 24 shall cause the recording of the dust concentration simultaneously with the deposit of the dust, thus to avoid the time lag between the moment of depositing a particular specimen of dust passing through the jet 2 and the record made at the moment when the specimen passes the window 14. In practice, however, no serious sources of error are introduced by this time lag.

The marker or stylus 49 and the record controlled by the actuating device 20 may be replaced by any other desired or selected instrument, such as signal apparatus for indicating when the dust concentration exceeds a predetermined value, or any suitable mechanism for controlling the amount of dust in the air or other gas to which the jet 2 is exposed. This last may be effected, for example, by controlling the degree of ventilation, as by starting or stopping a ventilating fan 100, operated by a motor 102 from relays 104 and 106 (Fig. 4), or by opening or closing dampers and the like (not shown); or auxiliary dust-removal equipment (not shown) might be operated to reduce the dust concentration in the vicinity. The fan 100 may be connected with a ventilating duct (not shown). If desired, the invention may be employed to control automatically an auxiliary ventilating system supplementary to the main exhaust equipment when the dust concentration exceeds a predetermined value.

The process is without interruption, there being a continuous stream, through the jet 2, of dust-laden gas, concentrated into measurable quantities, and new dust from the gas being continuously deposited on that portion of the continuously traveling film which happens to be disposed opposite to the jet 2. Since the area of the jet 2 and the width of the beam of light rays from the lamp 16 are constant, since the intensity of the said beam of light rays is also constant, and assuming that the air flow is likewise constant or its variability is known, the dust content of the medium is directly and continuously determined automatically and recorded by the marker or stylus 49, assuming that the speed of travel of the film past the jet 2 and the window 14 is likewise constant. A definite, continuous record of dustiness in factories, for example, is thus obtainable. The control of the dust content of the gas will also depend upon the above factors. By using the direct-reading record, furthermore, the engineer is enabled to determine the degree of success of the ventilating system, whether or not controlled by the apparatus of the present invention.

The said areas of the jet 2 and the width of the beam of light rays, as well as the distance of the film-carrying roll 12 from the jet 2, may be made adjustable in any desired way. The width of the jet 2 may be adjusted by moving one of the walls or jaws 33 (Fig. 3) thereof to and from the other jaw 35, and securing the adjustable jaw by means of screws 37 in slots 39. A spacer 41 may then be cemented or otherwise secured against the jaws 33, 35. The film 6 moves along this spacer and is thus located at a predetermined, constant separation from the jaws 33 and 35 of the jet. The roll 12 may be adjusted by mounting it on a slidably adjustable plate 53. The movements of the recorder stylus 49 may be calibrated from time to time by comparison with actual dust concentrations determined by standard methods of sanitary air analysis, as described hereinafter, or in other ways.

In the use of this instrument, care must be taken that the type of dust being deposited remains the same. Calibrations made against silica dust, for example, obviously do not apply to a dust of different color and different particle size, such as lamp black. Calibrations are made by comparing the record obtained against actual dust concentrations determined by any of the usual dust determining instruments. Different calibration data are necessary for each type of dust. Whether or not a calibration for one dust can be used on another is best determined by trial.

In order to calibrate the record obtained on the film against actual dust concentrations, the most convenient procedures we have found are the following. A cloud of the dust to be recorded is blown up or generated, preferably in a room, cabinet or space 70, Fig. 5, of about 1,000 to 3,000 cubic feet in capacity. Although this room need not be gas tight, the less it leaks the easier is the calibration. The dust recorder is connected to this room at 90, Fig. 5, and run in the manner described. At known times, and at known rates of air flow, samples of the cabinet air are taken at a point 80, Fig. 5, by means of an intermittent dust sampler 82, and the degree of dustiness or dust concentrations is determined in any of the severally known and approved methods, such as are described in U. S. Public Health Service Bulletin No. 144, 1925, entitled "Comparative Tests of Instruments for Determining Atmospheric Dusts". Other methods, such as the dust determination method of Drinker and Thomson Journal of Industrial Hygiene, 1925, vol. 7, page 261, entitled "Determination of suspensoids by alternating current precipitators", or that of J. S. Owens, entitled "Jet dust counting apparatus", Journal of Industrial Hygiene, 1922–23, vol. 4, page 522, may also be used. The results in any case are expressed as either numbers or weights of particles per unit volume of dusty air. As the time at which the sample is taken is known, the concentration or degree of dustiness by one of these methods is compared against dustiness as indicated by the recorder. By comparing the record of the recorder film with that of actual determinations by one of the methods described, and making these determinations over the range of concentrations desired, an accurate calibration curve is obtained. From this record, dust concentrations can be read or recorded continuously.

Other modifications will obviously occur to persons skilled in the art, and all such are considered to fall within the spirit and scope of the invention as defined in the appended claim.

What is claimed is:

Apparatus of the character described comprising a support, a member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, an actuable device for actuating selected instruments, means controlled in accordance with the amount of dust deposited upon the member from the stream of air for actuating the actuable device, and means for periodically interrupting the depositing of the dust on the member to indicate time intervals on the member.

PHILIP DRINKER.
WILLIS G. HAZARD.